US007800599B2

(12) United States Patent
Huang et al.

(10) Patent No.: US 7,800,599 B2
(45) Date of Patent: Sep. 21, 2010

(54) DISPLAY DRIVING DEVICE, DISPLAY DEVICE AND METHOD FOR DRIVING DISPLAY DEVICE

(75) Inventors: Ming-Wei Huang, Taoyuan County (TW); Juin-Ying Huang, Taoyuan County (TW); Wen-Tse Tseng, Taoyuan County (TW)

(73) Assignee: Chunghwa Picture Tubes, Ltd., Taoyuan (TW)

( * ) Notice: Subject to any disclaimer, the term of this patent is extended or adjusted under 35 U.S.C. 154(b) by 1110 days.

(21) Appl. No.: 11/456,095

(22) Filed: Jul. 7, 2006

(65) Prior Publication Data

US 2008/0007544 A1 Jan. 10, 2008

(51) Int. Cl.
*G06F 3/038* (2006.01)
*G09G 5/00* (2006.01)

(52) U.S. Cl. ........................................ 345/204

(58) Field of Classification Search .................. 345/10, 345/11, 29, 204–215, 690–699
See application file for complete search history.

(56) References Cited

U.S. PATENT DOCUMENTS 5,621,426 A * 4/1997 Okada et al. .................. 345/95

* cited by examiner

*Primary Examiner*—Srilakshmi K Kumar
(74) *Attorney, Agent, or Firm*—Jianq Chyun IP Office

(57) ABSTRACT

A display driving device is provided, which can solve the problem of stripes occurring on a display panel when accompanied with a system, such as a notebook computer system, upon booting. The display driving device includes a single-channel pulse width modulation circuit, a boost-lowering voltage circuit, a delay circuit, and a display driver. An operation voltage signal for enabling pixels is provided to the display panel with a delay by the delay circuit, so that it is later than the logic operation voltage signal for powering the display driving device, the voltage signal for enabling the pixels and that for disabling the pixels. Thus, the above "stripes" phenomenon can be eliminated.

11 Claims, 4 Drawing Sheets

DISPLAY DRIVING DEVICE, DISPLAY DEVICE AND METHOD FOR DRIVING DISPLAY DEVICE

BACKGROUND OF THE INVENTION

1. Field of Invention

The present invention relates to a display driving device, and more particularly to a display driving device for solving the problem of stripes occurring on a display panel when accompanied with a system, for example, a notebook computer system, upon booting.

2. Description of Related Art

In the recent digital times, flat panel display devices such as a liquid crystal display (LCD), an organic light emitting diode (OLED) display and a plasma display device, etc., have been accepted and popular in the market due to its features of light weight, thin, short, and compactness. In portable electronic devices, such as notebook computers, portable video disc players, personal digital assistants (PDAs) and the like, the flat panel display is even indispensable. However, when the flat panel display is accompanied with a system, such as a notebook computer system, the timing relationship between the respective voltage signals within the flat panel display and system data input signals is mismatched, thus upon booting, stripes may occur on the display panel. The stripes are regularly generated on the display panel from top to down, which undesirably consumes electrical power, and the display quality of the flat panel display is thereby questioned by the consumer.

FIG. 1 is a conventional display driving device 10, suitable for the above flat panel display. Referring to FIG. 1, the display driving device 10 comprises a single-channel pulse width modulation circuit 11, a boost-lowering voltage circuit 13, and a display driver 15. Wherein the voltage signals associated with the display panel 17 upon booting include a voltage signal VDDD for providing the logic operations of the display driving device 10, a voltage signal VDDG for enabling pixels of the display panel 17, a voltage signal VEEG for disabling the pixels of the display panel 17, and an operation voltage signal VDDA provided to the display panel 17 when the pixels is enabled.

Referring to FIG. 1, the single-channel pulse width modulation circuit 11 is powered by the voltage signal VDDD, and then output to supply the operation voltage signal VDDA when the pixels are enabled, to the buck-boost circuit 13 and the display driver 15. Then, the boost-lowering voltage circuit 13 provides the voltage signals VDDG and VEEG to the display driver 15, according to the voltage signal VDDA. The voltage signals VDDG and VEEG are respectively used for enabling and disabling the pixels of the display panel 17. Then, the display driver 15 is used to drive the display panel 17 according to the received voltage signals VDDA, VEEG, and VDDG.

The stripes occur on the display driving device 10 accompanied with a system such as a notebook computer system. Referring to FIG. 2, it is a timing chart of each voltage signal, system signal, and system data of the display driving device 10. It can be seen from the FIG. 2 that, the timing of the voltage signals VDDD, VDDA, VEEG, and VDDG is VDDD→VDDA→VEEG→VDDG. It can be seen from FIG. 2 that the display panel 17 has already been driven by the voltage signals VDDD, VDDA, VEEG, and VDDG, and starts to display the received data, before the system signal and the system data are generated, however, the data received by the display panel 17 at that time is not from the system, but random and irregular signals, whereby stripes are generated.

FIG. 3 is another conventional display driving device 30 to solve the above problem of stripes generated on the display driving device 10. The display driving device 30 includes a delay setting circuit 31, a multi-channel pulse width modulation circuit 33, and a display driver 35, wherein the display driver 35 is used to provide signals to drive the display panel 37. The display driving device 30 may use a delay setting circuit 31 and a multi-channel pulse width modulation circuit 33 to directly adjust the timing relationship among the voltage signals VDDA, VEEG, and VDDG into VEEG→VDDG→VDDA, thereby eliminating the phenomenon of stripes otherwise generated when random and irregular data signals are received at the display.

The display driving device 30 may use the delay setting circuit 31 and the multi-channel pulse width modulation circuit 33 to directly adjust the timing relationship among the three voltage signals VDDA, VEEG, and VDDG, to achieve a purpose of eliminating the stripes, but it is not a preferred solution due to the high cost thereof.

SUMMARY OF THE INVENTION

Accordingly, an object of the present invention is to provide a display driving device to solve the problem of stripes occur on a display panel accompanied with a system, such as a notebook computer system, upon booting, and to save the manufacturing cost as well, wherein the above display panel can be a liquid crystal display panel.

The display driving device comprises a display driver, a single-channel pulse width modulation circuit, a boost-lowering voltage circuit, and a delay circuit, wherein the display driver is used for driving the display panel. In an embodiment, the display driver comprises a scanning driver and a data driver. The single-channel pulse width modulation circuit is provided with the operation voltage by a logic voltage signal so as to provide a first voltage signal. The first voltage signal is used for providing an operation voltage for the display panel when the pixels are enabled. The boost-lowering voltage circuit is electrically connected between the single-channel pulse width modulation circuit and the display driver, and provides a second voltage signal and a third voltage signal according to the first voltage signal, wherein the second voltage signal is used for enabling the pixels of the display panel, and the third voltage signal is used for disabling the pixels of the display panel.

In addition, the delay circuit is electrically connected between the single-channel pulse width modulation circuit and the display driver so as to delay the first voltage signal and provide a fourth voltage signal, wherein the fourth voltage signal is the delayed form of the first voltage signal, and the timing of the fourth voltage signal is later than that of the second and third voltage signals. In an embodiment, the delay circuit comprises resistors and capacitors.

Another object of the present invention is to provide a display device, to solve the problem of generating stripes occur on the display panel accompanied with a system, such as a notebook computer system, and to save the manufacturing cost as well, wherein the above display panel can be a liquid crystal display panel. The display device comprises a display panel and the above display driving device, wherein the display panel is used for displaying the data output by the system.

Still another object of the present invention is to provide a method for driving a display device, wherein the display device is accompanied with a system, and the display device includes a display panel for displaying the system data output from the system. The driving method is used for solving the problem of stripes occurring on a display panel accompanied with a system, such as a notebook computer system, upon booting, wherein the above display panel can be a liquid crystal display panel.

In the driving method, first, a logic voltage signal is provided to the display device, wherein the logic voltage signal is used for providing a voltage for the logic operation of the display device. Then, the display device is powered by the logic voltage signal to provide a first voltage signal, a second voltage signal, and a third voltage signal, wherein the first voltage signal is used for providing an operation voltage for the display panel when the pixels are enabled, the second voltage signal for enabling the pixels of the display panel, and the third voltage signal for disabling the pixels of the display panel. After that, the first voltage signal is delayed to generate a fourth voltage signal, wherein the fourth voltage signal is a delayed form of the first voltage signal, and the timing of the fourth voltage signal is later than that of the second and third voltage signals. Then, the display panel is driven by the second voltage signal, the third voltage signal, and the fourth voltage signal.

In order to the make the aforementioned and other objects, features and advantages of the present invention comprehensible, a preferred embodiment accompanied with figures will be described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention, wherein.

DESCRIPTION OF EMBODIMENTS

For simplicity of illustrating the embodiments, the liquid crystal display is taken as an example for a display device, and the liquid crystal display panel is taken as an example for a display panel, and the computer system is taken as an example for a system hereinafter.

Figure 1:
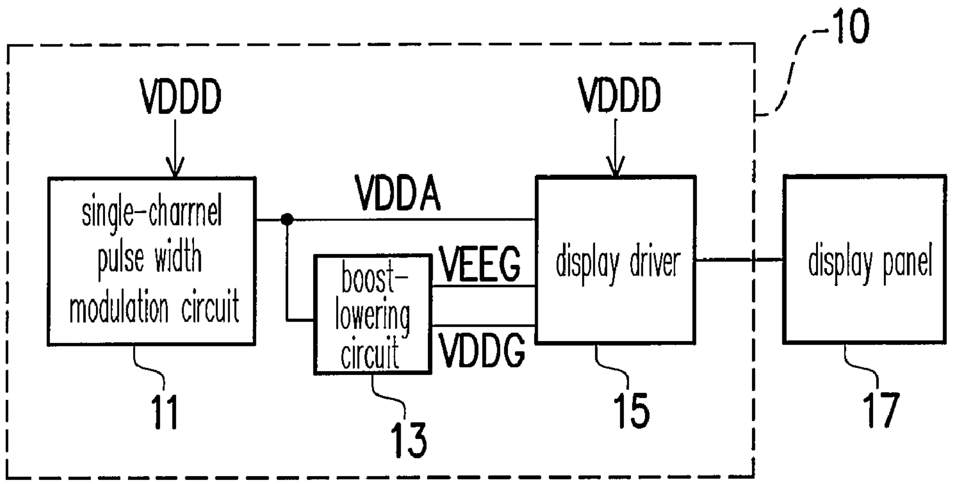
FIG. 1 is a block diagram of a conventional display driving device.
Figure 2:
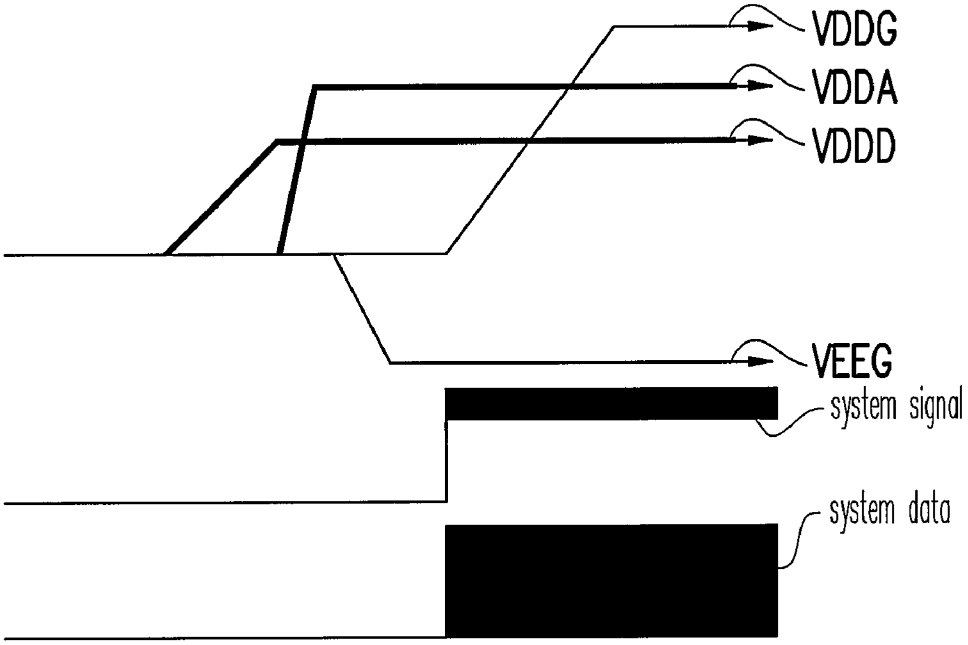
FIG. 2 is a timing chart of the respective voltage signals in the display driving device shown in FIG. 1.
Figure 3:
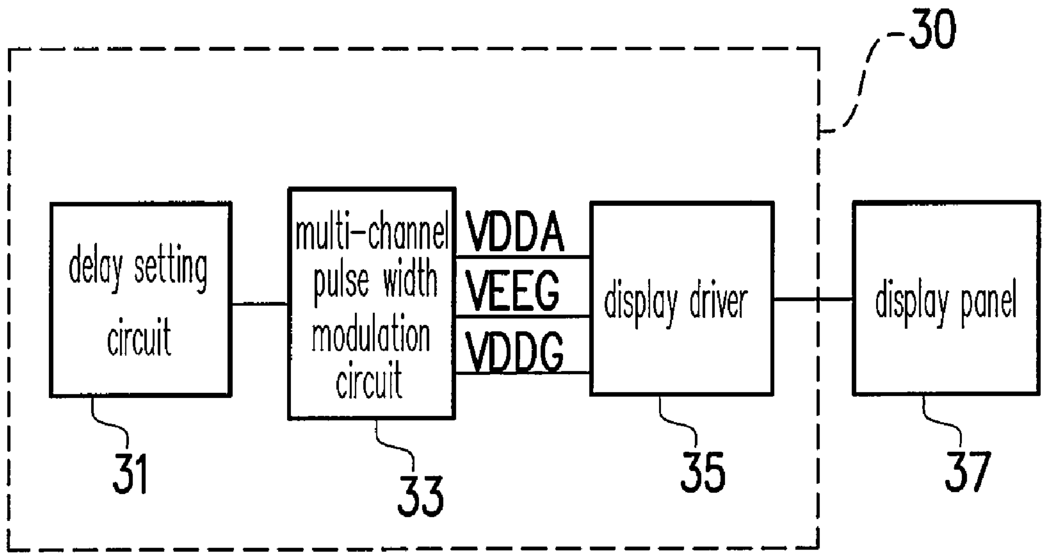
FIG. 3 is a block diagram of another conventional display driving device.
Figure 4:
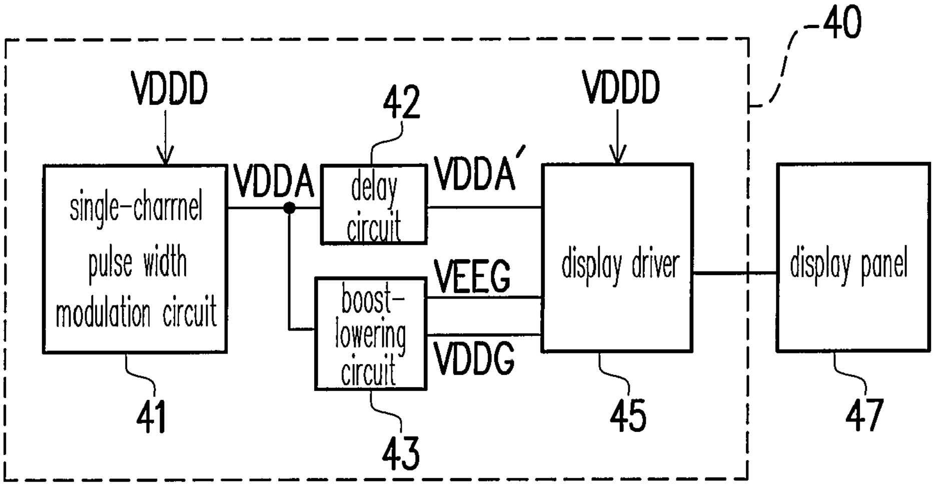
FIG. 4 is a block diagram of an embodiment of a display driving device according to the present invention.
Figure 5:
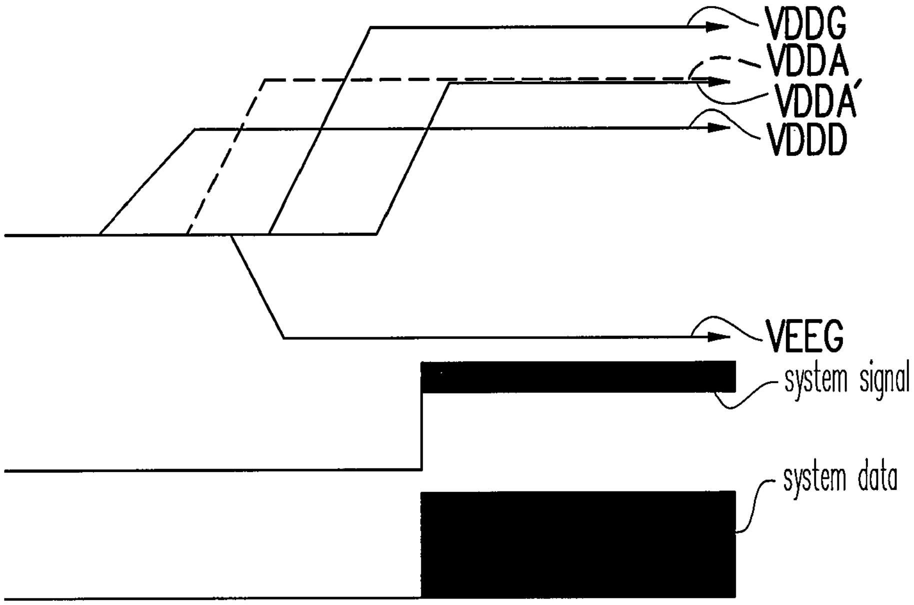
FIG. 5 is a timing chart of the respective voltage signals in the display driving device shown in FIG. 4.

FIG. 4 is a block diagram of an embodiment of a display driving device according to the present invention, and FIG. 5 is a timing chart of each voltage signal in the display driving device shown in FIG. 4. Referring to both FIG. 4 and FIG. 5, the display driving device 40 comprises a single-channel pulse width modulation circuit 41, a delay circuit 42, a boost-lowering voltage circuit 43, and a display driver 45, wherein the display driver 45 is electrically connected to the liquid crystal display panel 47. In an embodiment, the display driver 45 comprises a scanning driver and a data driver (not shown), which are used respectively for driving scan lines and data lines on the liquid crystal display panel 47. In addition, the liquid crystal display comprises the display driving device 40 and the liquid crystal display panel 47.

There are several voltage signals in the display driving device 40, including a logic voltage signal VDDD, a first voltage signal VDDA, a second voltage signal VDDG, a third voltage signal VEEG, and a fourth voltage signal VDDA', wherein the logic voltage signal VDDD is supplied for providing the power source voltage required by the operations of the single-channel pulse width modulation circuit 41 and the display driver 45, etc. The first voltage signal VDDA is used for providing the operation voltage for the display panel 47 when the pixels are enabled; the second voltage signal VDDG is used for enabling the pixels of the liquid crystal display panel 47; the third voltage signal VEEG is used for disabling the pixels of the liquid crystal display panel 47; and the fourth voltage signal VDDA' is a delayed form of the first voltage signal VDDA.

In an embodiment, the enabling and disabling of the pixels of the display panel 47 are controlled by a thin film transistor, and thus, the voltage signals VDDG and VEEG are input to the gate of the thin film transistor. When the pixels are enabled (i.e., the thin film transistor is enabled), the voltage signal VDDA is input to the pixel capacitor through the drain/source of the thin film transistor, and the rotation of the liquid crystal molecule is controlled by the voltage signal VDDA with the common voltage as a reference potential.

The single-channel pulse width modulation circuit 41 outputs the voltage signal VDDA to the delay circuit 42 and boost-lowering voltage circuit 43. The delay circuit 42 typically comprises resistors and capacitors, and the delay circuit 42 delays the voltage signal VDDA for a period of time and outputs a voltage signal VDDA'. Additionally, the boost-lowering voltage circuit 43 receives the voltage signal VDDA from the single-channel pulse width modulation circuit 41, and converts it into voltage signals VDDG and VEEG to be output to the display driver 45. Finally, the display driver 45 drives the liquid display panel 47 by the voltage signals VDDG, VEEG, and VDDA'.

After the above operations have been conducted to the voltage signals VDDD, VDDG, VEEG, and VDDA, the voltage signal VDDA is delayed for a period of time and converted to the voltage signal VDDA', as shown in FIG. 5, so that the timing of these voltage signals is switched from VDDD→VDDA→VEEG→VDDG to VDDD→VEEG→VDDG→VDDA', thereby eliminating the phenomenon of stripes otherwise generated on the display panel 47 upon booting when random and irregular signals are received.

Figure 6:
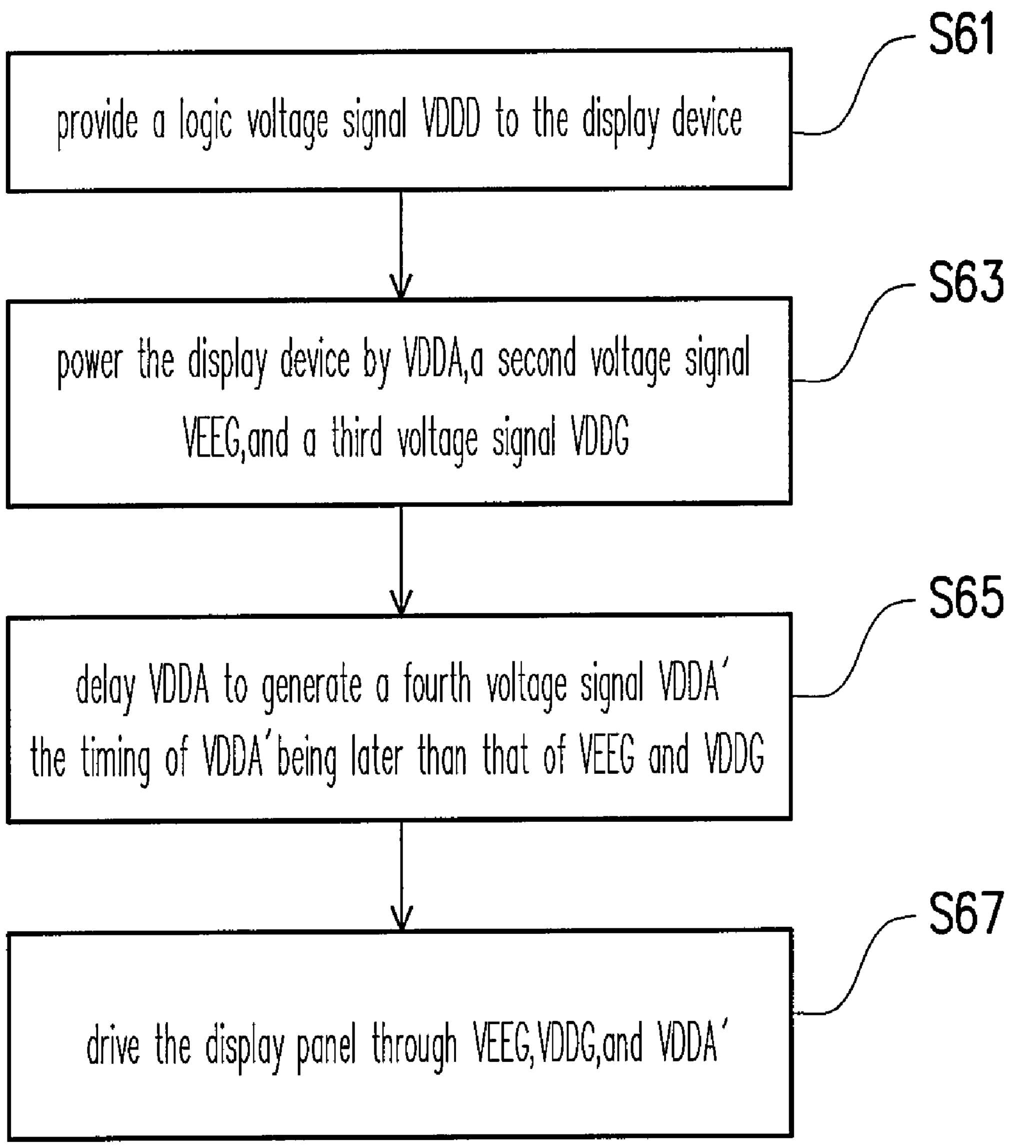
FIG. 6 is a flow chart of a driving method according to the present invention.

FIG. 6 is a flow chart of a method for driving the display device according to the present invention. Referring to FIG. 6, in the driving method, first, a logic voltage signal VDDD is provided to the liquid crystal display in step S61, wherein the logic voltage signal VDDD is used for providing voltages for the logic operations of the liquid crystal display. Next, in step S63, the liquid crystal display is powered by the logic voltage signal VDDD to provide a first voltage signal VDDA, a second voltage signal VDDG, and a third voltage signal VEEG, wherein the first voltage signal VDDA is used for providing the operation voltage for the liquid crystal display panel when the pixels are enabled; the second voltage signal VDDG is used for enabling the pixels of the liquid crystal display panel; and the third voltage signal VEEG is used for disabling the pixels of the liquid crystal display panel. After that, in step S65, a first voltage signal VDDA is delayed to generate a fourth voltage signal VDDA', wherein the fourth voltage signal VDDA' is the delayed form of the first voltage signal VDDA, and the timing of the fourth voltage signal VDDA' is later than that of the second voltage signal VDDG and the third voltage signal VEEG. Finally, in step S67, the second voltage signal VDDG, the third voltage signal VEEG, and the fourth voltage signal VDDA' are used for driving the liquid crystal display panel.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents. And the protected scope of the present invention shall be defined by the following claims.

What is claimed is:

1. A display driving device for driving a display panel accompanied with a system, comprising:

a display driver for driving the display panel;

a single-channel pulse width modulation circuit, receiving a logic voltage signal for powering the display panel and outputting a first voltage signal; wherein the first voltage signal is used for providing an operation voltage for the display panel when pixels are enabled;

a boost-lowering voltage circuit, electrically connected between the single-channel pulse width modulation circuit and the display driver so as to provide a second voltage signal and a third voltage signal according to the first voltage signal;

wherein the second voltage signal is used for enabling the pixels of the display panel, and the third voltage signal is used for turning off the pixels of the display panel; and a delay circuit, electrically connected between the single-channel pulse width modulation circuit and the display driver so as to delay the first voltage signal and provide a fourth voltage signal; wherein the fourth voltage signal is a delayed form of the first voltage signal, and the timing of the fourth voltage signal is later than that of the second and third voltage signals.

2. The display driving device of claim 1, wherein the system is a notebook computer.

3. The display driving device of claim 1, wherein the display panel is a liquid crystal display panel.

4. The display driving device of claim 1, wherein the delay circuit comprises resistors and capacitors.

5. The display driving device of claim 1, wherein the display driver comprises a scanning driver and a data driver.

6. A display device, accompanied with a system, comprising:

a display panel for displaying system data output by the system;

a display driver for driving the display panel;

a single-channel pulse width modulation circuit, receiving a logic voltage signal for powering the display panel and outputting a first voltage signal; wherein the first voltage signal is used for providing an operation voltage for the display panel when pixels are enabled;

a boost-lowering voltage circuit, electrically connected between the single-channel pulse width modulation circuit and the display driver so as to provide a second and third voltage signals according to the first voltage signal; wherein the second voltage signal is used for enabling the pixels of the display panel, the third voltage signal is used for turning off the pixels of the display panel; and a delay circuit, electrically connected between the single-channel pulse width modulation circuit and the display driver so as to delay the first voltage signal to provide a fourth voltage signal; wherein the fourth voltage signal is a delayed form of the first voltage signal, and the timing of the fourth voltage signal is later than that of the second voltage signal and the third voltage signal.

7. The display device of claim 6, wherein the system is a notebook computer.

8. The display device of claim 6, wherein the display panel is a liquid crystal display panel.

9. The display device of claim 6, wherein the delay circuit comprises resistors and capacitors.

10. The display device of claim 6, wherein the display driver comprises a scanning driver and a data driver.

11. A method for driving a display device, the method comprising:

providing a logic voltage signal to the display device, wherein the logic voltage signal provides a voltage for the logic operation of the display device;

powering the display device by the logic voltage signal to provide a first voltage signal, a second voltage signal, and a third voltage signal, wherein the first voltage signal provides an operation voltage for a display panel of the display device when pixels of the display panel are enabled; the second voltage signal enables the pixels of the display panel; and the third voltage signal turns off the pixels of the display panel;

delaying the first voltage signal to generate a fourth voltage signal, wherein the fourth voltage signal is a delayed form of the first voltage signal, and the timing of the fourth voltage signal is later than that of the second voltage signal and the third voltage signal; and driving the display panel through the second voltage signal, the third voltage signal, and the fourth voltage signal.

* * * * *